US012567905B2

(12) United States Patent
Xiao et al.

(10) Patent No.: US 12,567,905 B2
(45) Date of Patent: Mar. 3, 2026

(54) METHOD AND APPARATUS FOR DETECTING FAILURE OF PASSIVE WAVELENGTH DIVISION EQUIPMENT, SERVER, AND STORAGE MEDIUM

(71) Applicant: ZTE Corporation, Shenzhen (CN)

(72) Inventors: Lei Xiao, Shenzhen (CN); Tao Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 322 days.

(21) Appl. No.: 18/571,369

(22) PCT Filed: May 31, 2022

(86) PCT No.: PCT/CN2022/096413
§ 371 (c)(1),
(2) Date: Dec. 18, 2023

(87) PCT Pub. No.: WO2022/262573
PCT Pub. Date: Dec. 22, 2022

(65) Prior Publication Data
US 2024/0146411 A1 May 2, 2024

(30) Foreign Application Priority Data

Jun. 16, 2021 (CN) .......................... 202110665058.8

(51) Int. Cl.
*H04B 10/00* (2013.01)
*H04B 10/079* (2013.01)
*H04Q 11/00* (2006.01)
(52) U.S. Cl.
CPC ..... *H04B 10/0795* (2013.01); *H04Q 11/0067* (2013.01); *H04Q 2011/0083* (2013.01)

(58) Field of Classification Search
CPC ............ H04B 10/0795; H04B 10/0773; H04B 10/0793; H04Q 11/0067;
(Continued)

(56) References Cited

U.S. PATENT DOCUMENTS 6,404,525 B1 * 6/2002 Shimomura ........... H04B 10/03
398/9
2002/0159113 A1 10/2002 Tokunaga
(Continued)

FOREIGN PATENT DOCUMENTS

CN 101090296 A 12/2007
CN 102571407 A 7/2012
(Continued)

OTHER PUBLICATIONS

European Search Report for corresponding application EP22824053; Report dated Sep. 11, 2024.
(Continued)

*Primary Examiner* — Agustin Bello
(74) *Attorney, Agent, or Firm* — CANTOR COLBURN LLP

(57) ABSTRACT

A method for detecting failure of passive wavelength division equipment includes: determining whether base station equipment is pre-modeled; when the base station equipment is not pre-modeled, dividing the first side equipment and the second side equipment in the base station equipment into a plurality of equipment groups; obtaining optical port alarm information of the first side equipment in the base station equipment and/or optical port alarm information of the second side equipment in the base station equipment, or obtaining link disconnection alarm information of the second side equipment in the base station equipment; when no link disconnection alarm information of the second side equipment is obtained, and it is determined, according to the (Continued)

optical port alarm information, that there is an equipment group satisfying a first preset condition, determining that the passive wavelength division equipment corresponding to the equipment group satisfying the first preset condition fails.

20 Claims, 5 Drawing Sheets

(58) Field of Classification Search
CPC .......... H04Q 2011/0083; H04J 14/0297; H04J 14/0242; H04W 24/04
See application file for complete search history.

(56) References Cited

U.S. PATENT DOCUMENTS

| | | | | |
|---|---|---|---|---|
| 2004/0052521 | A1* | 3/2004 | Halgren | H04J 14/0245 398/19 |
| 2007/0260911 | A1* | 11/2007 | Marilly | H04L 41/0663 714/4.1 |
| 2009/0060496 | A1* | 3/2009 | Liu | H04Q 11/0067 398/17 |
| 2015/0288445 | A1* | 10/2015 | Lins de Medeiros | H04L 41/0645 398/20 |
| 2016/0308608 | A1* | 10/2016 | Ejima | H04J 14/0283 |
| 2019/0356535 | A1* | 11/2019 | Li | H04L 41/0631 |
| 2020/0204253 | A1* | 6/2020 | Jin | H04B 10/0791 |
| 2020/0396120 | A1* | 12/2020 | Guilbeault | H04L 41/0672 |
| 2024/0014896 | A1* | 1/2024 | Lin | G01M 11/3136 |
| 2024/0146411 | A1* | 5/2024 | Xiao | H04J 14/0297 |
| 2025/0293773 | A1* | 9/2025 | Wang | H04B 10/071 |

FOREIGN PATENT DOCUMENTS

| | | |
|---|---|---|
| CN | 106130627 A | 11/2016 |
| CN | 106452571 A | 2/2017 |
| CN | 106130627 B | 5/2018 |
| CN | 109428647 A | 3/2019 |
| CN | 110505008 A | 11/2019 |
| CN | 109120338 B | 11/2020 |
| CN | 211908818 U | 11/2020 |
| CN | 112825503 A | 5/2021 |
| CN | 213305404 U | 5/2021 |
| CN | 113114357 A | 7/2021 |
| WO | 2020244628 A1 | 12/2020 |

OTHER PUBLICATIONS

International Search Report for corresponding application PCT/CN2022/096413 filed May 31, 2022; Mail date Aug. 18, 2022.

* cited by examiner

Obtain alarm information of the first side equipment and/or the second side equipment

502

Whether there is link disconnection alarm information of the second side equipment in the alarm information Yes No

504

Whether all optical ports of the first side equipment and/or the second side equipment in the equipment group corresponding to the first side equipment and/or the second side equipment which send alarm information send an optical port alarm

503

Determine, according to the link disconnection alarm information, that the passive wavelength division equipment in the equipment group corresponding to the second side equipment fails No The passive wavelength division equipment in equipment group does not fail Yes The passive wavelength division equipment in the equipment group fails

Fig. 6

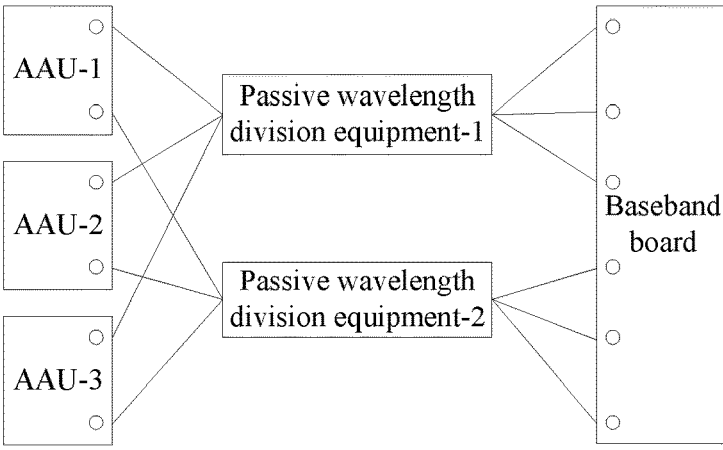

METHOD AND APPARATUS FOR DETECTING FAILURE OF PASSIVE WAVELENGTH DIVISION EQUIPMENT, SERVER, AND STORAGE MEDIUM

CROSS-REFERENCE TO RELATED APPLICATION

The present disclosure is a National Stage Filing of the PCT International Application No. PCT/CN2022/096413 filed on May 31, 2022, which is based upon and claims priority to Chinese Patent Application No. 202110665058.8, filed on Jun. 16, 2021, the entire contents of which are incorporated herein by reference.

TECHNICAL FIELD

Embodiments of the present disclosure relate to the technical field of Fifth Generation (5G) networks, and in particular, to a method and apparatus for detecting failure of passive wavelength division equipment, a server, and a storage medium.

BACKGROUND

A Distributed Radio Access Network (Distributed RAN, short as DRAN) is mainly adopted for the networking of Third Generation (3G)/Fourth Generation (4G) network devices, and a Centralized Radio Access Network (Centralized RAN, short as CRAN) is mainly adopted for the networking of 5G network devices. With the commercial use of the 5G network, the current communication network needs to be modified into the 5G network or provided with newly added 5G network, which dramatically increases the amount of optical fibers. Since a wavelength division multiplexer can combine optical signals carrying information and having different wavelengths into a combined optical signal and transmit the combined optional signal along a single optical fiber, the number of optical fibers may be greatly reduced, and thus the problem of networking of an optical fiber network may be solved by using the wavelength division multiplexer. The wavelength division multiplexers may be classified into active wavelength division multiplexers, passive wavelength division multiplexers, and semi-active wavelength division multiplexers. Since the network modification based on passive wavelength division multiplexers has a relatively low cost, the passive wavelength division multiplexing is mainly adopted for the networking of most of the 5G network devices.

During wireless network management, nodes that possibly have failures include: Remote Radio Unit (RRU)/Active Antenna Unit (AAU) side equipment, passive wavelength division equipment, baseband board side equipment, and the like. However, among the nodes that possibly have failures, the wireless network can only send alarm information for the RRU/AAU side equipment and the baseband board side equipment, and therefore failure of passive wavelength division equipment cannot be accurately identified.

SUMMARY

The embodiments of the present disclosure provide a method for detecting failure of passive wavelength division equipment, including the following operations: determining whether base station equipment is pre-modeled, wherein the base station equipment at least includes first side equipment, second side equipment, and passive wavelength division equipment; in a case where the base station equipment is not pre-modeled, dividing the first side equipment and the second side equipment in the base station equipment into a plurality of equipment groups, wherein the first side equipment and the second side equipment having a connection relationship belong to the same equipment group, and each equipment group has one set of correspondingly connected passive wavelength division equipment; obtaining optical port alarm information of the first side equipment in the base station equipment and/or optical port alarm information of the second side equipment in the base station equipment, or obtaining link disconnection alarm information of the second side equipment in the base station equipment; and in a case where no link disconnection alarm information of the second side equipment is obtained, and it is determined, according to the optical port alarm information, that there is an equipment group satisfying a first preset condition, determining that the passive wavelength division equipment corresponding to the equipment group satisfying the first preset condition fails, wherein the first preset condition includes: in the same equipment group, optical ports, for connecting to the passive optical division equipment, of respective first side equipment all send an alarm, and/or optical ports, for connecting to the passive optical division equipment, of respective second side equipment all send an alarm.

The embodiments of the present disclosure further provide an apparatus for detecting failure of passive wavelength division equipment. The apparatus includes: a modeling determination module, configured to determine whether base station equipment is pre-modeled, wherein the base station equipment at least includes first side equipment, second side equipment, and passive wavelength division equipment; an equipment grouping module, configured to divide, in a case where the base station equipment is not pre-modeled, the first side equipment and the second side equipment in the base station equipment into a plurality of equipment groups, wherein the first side equipment and the second side equipment having a connection relationship belong to the same equipment group, and each equipment group has one set of correspondingly connected passive wavelength division equipment; an alarm obtaining module, configured to obtain optical port alarm information of the first side equipment in the base station equipment and/or optical port alarm information of the second side equipment in the base station equipment, or obtain link disconnection alarm information of the second side equipment in the base station equipment; and a failure detection module, configured to: in a case where no link disconnection alarm information of the second side equipment is obtained, and it is determined, according to the optical port alarm information, that there is an equipment group satisfying a first preset condition, determine that the passive wavelength division equipment corresponding to the equipment group satisfying the first preset condition fails, wherein the first preset condition includes: in the same equipment group, optical ports, for connecting to the passive optical division equipment, of respective first side equipment all send an alarm, and/or optical ports, for connecting to the passive optical division equipment, of respective second side equipment all send an alarm.

The embodiments of the present disclosure further provides a server, including: at least one processor; and a memory in communication connection with the at least one processor, wherein the memory stores an instruction that is able to be executed by the at least one processor, wherein the instruction, when being executed by the at least one processor, causes the at least one processor to execute the method for detecting failure of passive wavelength division equipment.

BRIEF DESCRIPTION OF THE DRAWINGS

One or more embodiments are exemplified by the figures in the accompanying drawings, which do not constitute a limitation on the embodiments.

FIG. 5 is a flowchart for detecting failure of passive wavelength division equipment according to the embodiments of the present disclosure;

FIG. 6 is a connection scheme 2 of the method for detecting failure of passive wavelength division equipment according to the embodiments of the present disclosure;

DETAILED DESCRIPTION

Figure 1:
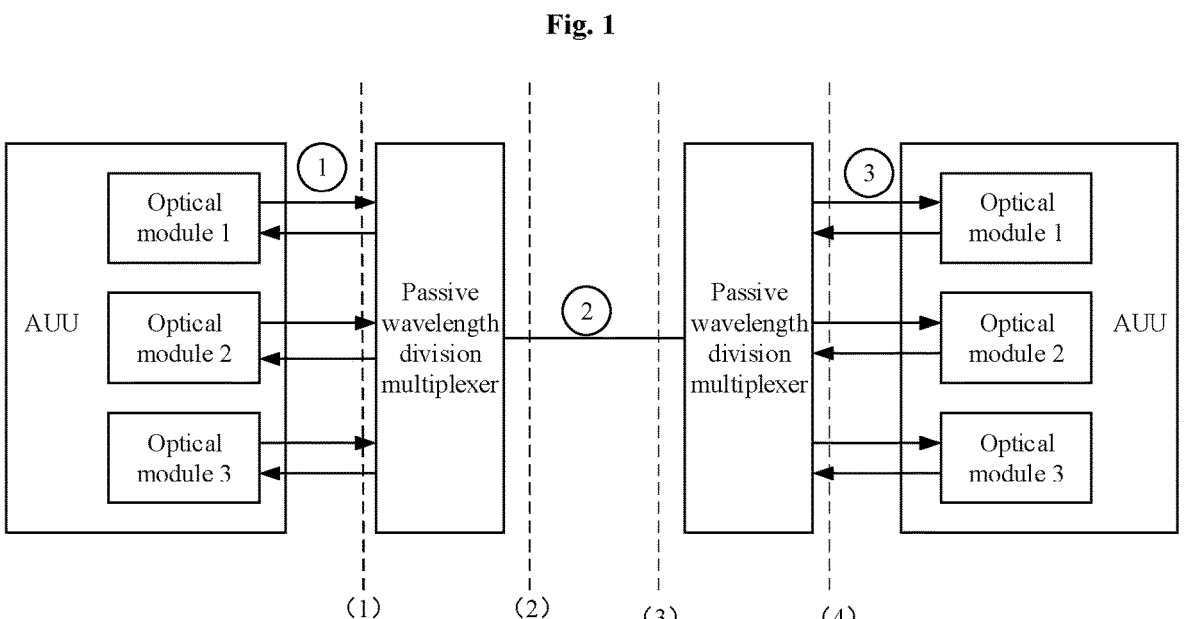
FIG. 1 is a schematic diagram of base station equipment according to the embodiments of the present disclosure.

The embodiments of the present disclosure mainly propose a method and apparatus for detecting failure of passive wavelength division equipment, a server, and a storage medium, which may accurately determine failed equipment based on alarm information.

In the method and apparatus for detecting failure of passive wavelength division equipment, the server, and the storage medium provided in the embodiments of the present disclosure, whether to divide multiple pieces of base station equipment into groups is determined, that is, two different methods are provided for two cases where the multiple pieces of base station equipment are modeled and are not modeled, so that the method for detecting failure of passive wavelength division equipment of the embodiments of the present disclosure may be applicable to more application scenarios. When the multiple pieces of base station equipment are not modeled, the multiple pieces of base station equipment are divided into groups according to a connection relationship, so that the passive wavelength division equipment connected to the first side equipment and the second side equipment may be determined according to the equipment group, and further the failed passive wavelength division equipment may be determined based on the alarm information of the first side equipment and/or the second side equipment. By dividing the base station equipment into groups, operation and maintenance personnel can clearly identify failed passive wavelength division equipment, and then quickly determine the location of the failed passive wavelength division equipment, thereby solving the problem in the related art that failure of passive wavelength division equipment cannot be accurately identified, and reducing the time spent by the operation and maintenance personnel on failure detection.

To make the objectives, technical solutions, and advantages of the embodiments of the present disclosure clearer, the following describes respective embodiments of the present disclosure in detail with reference to the accompanying drawings. However, a person having ordinary skill in the art may understand that, in the embodiments of the present disclosure, many technical details are put forward to help a reader understand the present disclosure better. However, even without these technical details or even making various changes and modifications based on the following embodiments, the claimed technical solutions of the present disclosure can be implemented. The division of the following embodiments is for convenience of description, and shall not constitute any limitation to exemplary implementations of the present disclosure. The embodiments may be referred to or combined with each other without any contradiction.

The division of the following embodiments is for convenience of description, and shall not constitute any limitation to exemplary implementations of the present disclosure. The embodiments may be referred to or combined with each other without any contradiction.

In order to facilitate understanding of the embodiments of the present disclosure, networking of a 5G network is described first.

In a 5G network, a 25G passive Coarse Wavelength Division Multiplexer (CWDM) with colored optics in passive wavelength division equipment is generally used for wavelength division multiplexing. The 25G CWDM consists of a 25G CWDM optical module and a CWDM multiplexer/demultiplexer. The 25G CWDM optical module is arranged on an interface board of a Building Base band Unit (BBU)/Distributed Unit (DU) side and an interface board of an RRU/AAU side. The CWDM multiplexer/demultiplexer are generally arranged on a specific slot of a device rack or in a cable switching box. The schematic diagram of respective base station equipment in the networking is as shown in FIG. 1. In FIG. 1, optical modules 1-6 are 25 Gb/s CWDM optical modules with colored optics, ① represents a fiber-optic patch cord connecting the optical module and the passive wavelength division multiplexer, and may be an armour fiber-optic patch cord or a short fiber-optic patch cord, ② represents an optical fiber connecting the passive wavelength division multiplexer and the passive wavelength division demultiplexer, and may be an optical cable or a fiber-optic patch cord, and ③ represents a fiber-optic patch cord connecting the optical module and the passive wavelength division demultiplexer. In FIG. 1, (1) represents a fiber side of the multiplexer, (2) represents a cable side of the multiplexer, (3) represents a cable side of the demultiplexer, and (4) represents a cable side of the demultiplexer.

In the network management, nodes that possibly have failures include three parts, respectively being an RRU/AAU side, a forward transmission link, and a baseband board side. The RRU/AAU side equipment includes a main device, an optical module, a tail fiber, etc.; the forward transmission link includes a forward transmission optical cable, passive wavelength division equipment, etc.; and the baseband board side includes a channel board, an optical module, a tail fiber, etc. Among the three parts of equipment which may have failures, the RRU/AAU side equipment and the baseband board side equipment may monitor their failure situation, while the failure of the passive wavelength division equipment in the forward transmission link cannot be monitored by conventional means.

Figure 2:
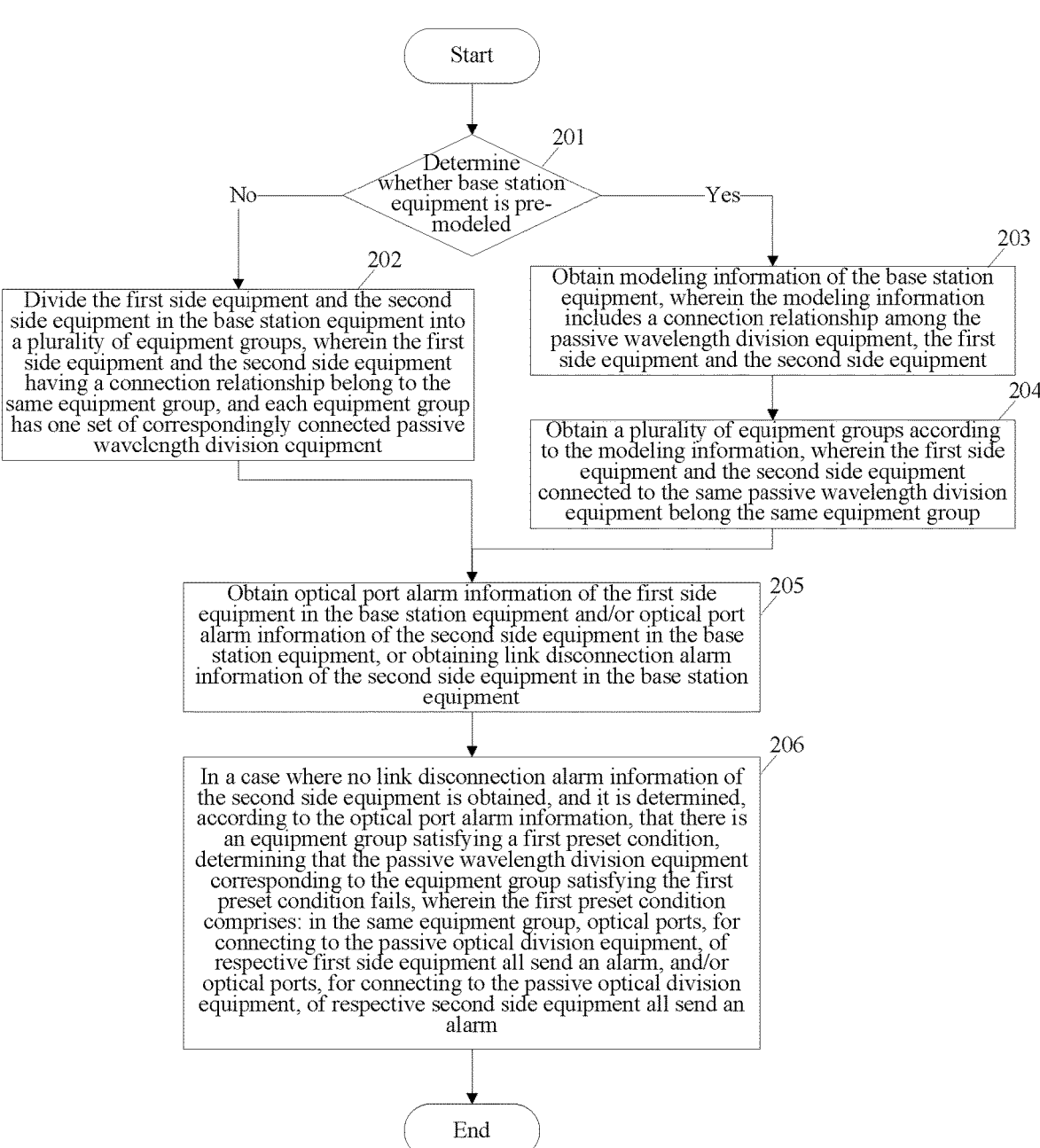
FIG. 2 is a flowchart of a method for detecting failure of passive wavelength division equipment according to the embodiments of the present disclosure.

The embodiments of the present disclosure provide a method for detecting failure of passive wavelength division equipment. An exemplary process is shown in FIG. 2, and includes the following operations 201 to 206.

At operation 201, whether base station equipment is pre-modeled is determined, wherein the base station equipment at least includes first side equipment, second side equipment, and passive wavelength division equipment.

In the modeling process, in addition to modeling an uplink/downlink relationship for optical links of the first side equipment and the second side equipment, that is, a connection relationship between the first side equipment and the second side equipment, passive wavelength division equipment among the base station equipment needs to be determined, a dedicated equipment table (as shown in Table 1) may be established for the passive wavelength division equipment, and a connection relationship among the first side equipment, the second side equipment and the passive wavelength division equipment is determined, as shown in Table 2.

TABLE 1

Equipment table for the wavelength division equipment

| Subnet ID | Network element ID | Device location | Type of wavelength division equipment |
|-----------|--------------------|-----------------|----------------------------------------|
| 421909606 | 10294094 | Equipment = 1, OMDUnit = OMD__1 | OMD |
| 421909606 | 10294094 | Equipment = 1, OMDUnit = OMD__2 | OMD |

TABLE 2

Link table for the wavelength division equipment

| Link Number | Subnet ID | Network element ID | Source address of the link | Destination address of the link |
|-------------|-----------|--------------------|-----------------------------|----------------------------------|
| 1 | 421909606 | 10294094 | Equipment = 1, ReplaceableUnit = VBP__1__7, RiPort = OF1 | Equipment = 1, OMDUnit = OMD__1, OMDPort = PORT1 |
| 2 | 421909606 | 10294094 | Equipment = 1, OMDUnit = OMD__2, OMDPort = PORT1 | Equipment = 1, ReplaceableUnit = 51, RiPort = OPT1 |
| 3 | 421909606 | 421909606 | Equipment = 1, OMDUnit = OMD__1 | Equipment = 1, OMDUnit = OMD__2 |

Whether the base station equipment is pre-modeled is determined.

In a case where the base station equipment is not pre-modeled, operation 202 is executed.

In a case where the base station equipment is pre-modeled, operation 203 is executed.

At operation 202, in a case where the base station equipment is not pre-modeled, the first side equipment and the second side equipment in the base station equipment are divided into a plurality of equipment groups, wherein the first side equipment and the second side equipment having a connection relationship belong to the same equipment group, and each equipment group has one set of correspondingly connected passive wavelength division equipment.

Configuration information of respective base station equipment in a base station is obtained, wherein the configuration information includes the connection relationship between the first side equipment and the second side equipment and an optical port wavelength of baseband board equipment in the first side equipment. In this embodiment, the optical port may be an optical module.

In some examples, the first side equipment is baseband board equipment. The operation that the first side equipment and the second side equipment in the base station equipment are divided into the plurality of equipment groups includes: the first side equipment satisfying a wavelength requirement of the passive wavelength division equipment is screened according to the optical port wavelength of the baseband board equipment; and the second side equipment connected to the screened first side equipment is determined according to the connection relationship between the first side equipment and the second side equipment, so as to obtain the plurality of equipment groups. In this way, when the connection relationship between the passive wavelength division equipment and other equipment is not known, the passive wavelength division equipment connected to the equipment corresponding to the alarm information can still be determined, thereby ensuring the accuracy of failure detection of the passive wavelength division equipment.

For example, the first side equipment satisfying the wavelength requirement of the passive wavelength division equipment may be determined as follows: when the transmission wavelength of the optical ports of the baseband board includes any three wavelengths of 1331, 1351, 1371, 1271, 1291, and 1311, it may be determined that the baseband board satisfies the wavelength requirement of the passive wavelength division equipment.

The connection relationship between the first side equipment and the second side equipment indicates whether a path for connection exists between the first side equipment and the second side equipment that have an uplink/downlink relationship. Therefore, the second side equipment that is connected to the screened first side equipment may be determined according to the connection relationship between the first side equipment and the second side equipment. Based on the determined first side equipment, grouping may be performed on the determined second side equipment and the connection relationship between the first side equipment and the second side equipment. For example, it is assumed that a baseband board-1 and a baseband board-2 are first side equipment satisfying the wavelength requirement of the passive wavelength division equipment, then it can be determined, according to the connection relationship, that the baseband board-1 has a connection with AAU-1, AAU-2 and AAU-3, and the baseband board-2 has a connection with AAU-4, AAU-5 and AAU-6; therefore, the baseband board-1 and AAU-1, AAU-2 and AAU-3 are determined to belong to the same group, and the baseband board-2 and AAU-4, AAU-5 and AAU-6 are determined to belong to the same group.

In some examples, the second side equipment at least includes an active antenna processing unit (e.g., AAU). After determining, according to the connection relationship between the first side equipment and the second side equipment, the second side equipment connected to the screened first side equipment, so as to obtain the plurality of equipment groups, the method includes: an equipment group of which the number of pieces of second side equipment is a preset number is screened from the plurality of obtained equipment groups, and the screened equipment group is determined as a final grouping result. Further screening is performed on the equipment groups, so that the number of pieces of equipment for which failure detection needs to be performed may be reduced, and a grouping result is more suitable for detecting failure of passive wavelength division equipment.

The second side equipment at least includes AAU equipment and RRU equipment. When applied in a complete 5G network, the second side equipment generally only includes AAU equipment. When applied in a hybrid network of 5G and 4G networks, the second side equipment generally includes both AAU equipment and RRU equipment.

The preset number is the number of pieces of second side equipment to be connected to the passive wavelength division equipment, and is appointed when performing field equipment connection, that is to say, the preset number is determined according to the connection situation of the base station equipment. For example, the preset number is appointed to be 3, and the equipment group(s) with the number of pieces of AAU equipment being 3 is screened out from the plurality of equipment groups as the final grouping result. By screening, from the plurality of equipment groups, the equipment group in which the number of pieces of AAU equipment is the preset number, the equipment group including the passive wavelength division equipment can be obtained more accurately.

In this embodiment, the first side equipment and the second side equipment are divided into equipment groups by taking the equipment as a unit, and it is considered that each equipment group only includes one set of passive wavelength division equipment.

In some examples, a topological graph of each obtained equipment group is generated according to the plurality of obtained equipment groups; and when the first side equipment and/or the second side equipment in the equipment group send an alarm, the first side equipment and/or the second side equipment that send the alarm are automatically identified in the topological graph.

Figure 3:
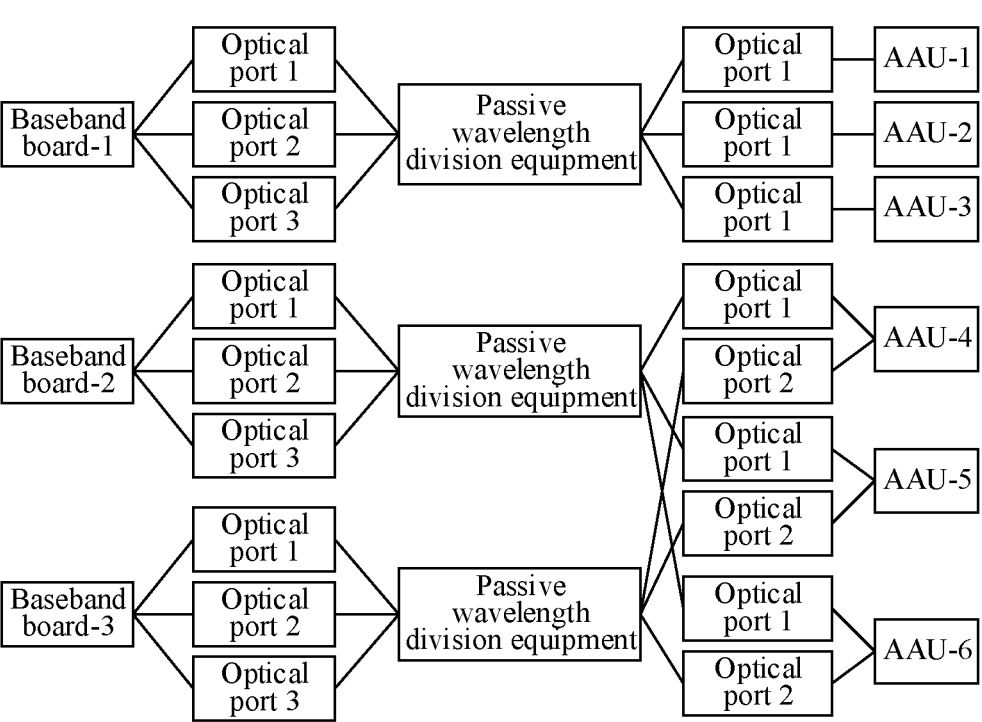
FIG. 3 is a diagram of a networking topology according to the embodiments of the present disclosure.

By establishing a topological graph of each equipment group, the connection relationship between multiple pieces of equipment may be visually reflected, and the passive multiplexer/demultiplexer corresponding to certain equipment can be identified more clearly, thereby facilitating operation and maintenance personnel to quickly locate failed equipment. In addition, respective equipment groups may be integrated to obtain a topological diagram of all equipment related to the passive wavelength division equipment, as shown in FIG. 3. Because the equipment that gives out an alarm may be automatically identified on the topology diagram, when an alarm is given, other equipment connected to the equipment that has the alarm can be quickly determined according to the equipment identified (marked) on the topology diagram, so that failed equipment can be quickly identified and diagnosed.

It should be noted that, in this embodiment, during the connection of the field device, it is appointed that each piece of baseband board equipment is connected to a preset number of second side equipment, that is, the preset number is determined according to an actual connection relationship of the base station equipment.

At operation 203, in a case where the base station equipment is pre-modeled, modeling information of the base station equipment is obtained. The modeling information includes a connection relationship among the passive wavelength division equipment, the first side equipment and the second side equipment.

At operation 204, a plurality of equipment groups is obtained according to the modeling information, wherein the first side equipment and the second side equipment which are connected to the same passive wavelength division equipment belong to the same equipment group.

With regard to the modeled base station equipment, the connection relationship among the first side equipment, the second side equipment and the passive wavelength division equipment can be directly determined according to modeling information without the grouping process, thereby reducing the flow of the grouping process. In addition, the modeling information obtained through pre-modeling for the base station equipment is established according to the connection relationship during actual networking, and therefore, the accuracy of determining the connection relationship will be improved to some extent. Moreover, the modeling may be applicable to any networking connection scheme, so that the method for detecting failure of passive wavelength division equipment provided in the embodiments of the present disclosure is applicable to more application scenarios.

At operation 205, port alarm information of the first side equipment in the base station equipment and/or port alarm information of the second side equipment in the base station equipment, or link disconnection alarm information of the second side equipment are/is obtained.

The wireless network management may obtain the optical port alarm information of the base station and the link disconnection alarm information of the second side equipment. The optical port alarm information includes alarm information indicating optical port link failure and alarm information indicating received optical power exception. The link disconnection alarm generally occurs at the RRU device in the second side equipment. The link disconnection alarm information and the optical port alarm information include the optical port or the equipment that sends the alarm. That is to say, the wireless network management may receive the following types of alarm information: 1. the optical port alarm information of the first side equipment; 2. the optical port alarm information of the second side equipment; 3. the optical port alarm information of the first side equipment and the second side equipment; and 4. the link disconnection alarm information of the second side equipment. The same second side equipment cannot send the optical port alarm information and the link disconnection alarm information at the same time.

At operation 206, in a case where it is determined, according to the optical port alarm information, that there is an equipment group satisfying a first preset condition, it is determined that the passive wavelength division equipment corresponding to the equipment group satisfying the first preset condition fails. The first preset condition includes: in the same equipment group, optical ports, for connecting to the passive optical division equipment, of respective first side equipment all send an alarm, and/or optical ports, for connecting to the passive optical division equipment, of respective second side equipment all send an alarm.

In a case where the wireless network management obtains the link disconnection alarm information of the second side equipment, the wireless network management determines, according to the link disconnection alarm information, the second side equipment that sends the link disconnection alarm, and determines that the passive wavelength division equipment corresponding to the equipment group, to which the second side equipment that sends the link disconnection alarm belongs, fails. In a case where all of the respective second side equipment in the same equipment group send the link disconnection alarm information, it is determined that the passive wavelength division equipment in the equipment group fails. Taking the equipment group in FIG. 4 as an example, when AAU-1, AAU-2 and AAU-3 all send a link disconnection alarm, it represents that the passive wavelength division equipment of the equipment group fails.

In a case where the wireless network management obtains the optical port alarm information of the first side equipment and/or the second side equipment, the wireless network management determines, according to the optical port alarm information, the optical port that sends an alarm, when the optical ports, for connecting to the passive optical division equipment, of respective first side equipment in one equipment group all send an alarm, and/or the optical ports, for connecting to the passive optical division equipment, of respective second side equipment in one equipment group all send an alarm, it may be determined that the passive wavelength division equipment in the equipment group fails.

Figure 4:
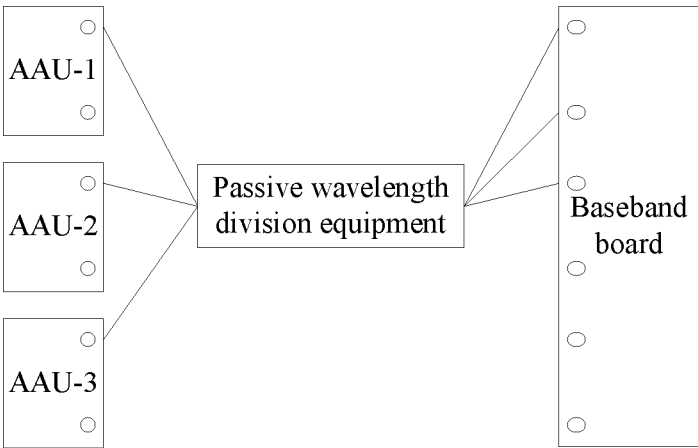
FIG. 4 is a connection scheme 1 of the method for detecting failure of passive wavelength division equipment according to the embodiments of the present disclosure.

Taking the equipment group in FIG. 4 as an example, when all of the first optical port of AAU-1, the first optical port of AAU-2 and the first optical port of AAU-3 send an alarm, it may be determined that the passive wavelength division equipment in the equipment group fails. Furthermore, since the alarm is sent for the optical ports of the respective AAU equipment in the equipment group, it may be determined that the passive wavelength division equipment that is close to the AAU equipment fails.

Alternatively or additionally, in the equipment group as shown in FIG. 4, when the first optical port, the second optical port and the third optical port of the baseband board send an alarm, it may be determined that the passive wavelength division equipment in the equipment group fails. Furthermore, since the alarm is sent for the optical ports of the baseband board equipment in the equipment group, it may be determined that the passive wavelength division equipment which is close to the baseband board equipment fails.

FIG. 5 shows a failure detection process of the passive wavelength division equipment, which includes the following operations 501 to 504.

At operation 501, alarm information of first side equipment and/or second side equipment is obtained.

At operation 502, whether the alarm information includes link disconnection alarm information of the second side equipment is determined.

In a case where the alarm information includes the link disconnection alarm information of the second side equipment, operation 503 is executed.

In a case where the alarm information does not include the link disconnection alarm information of the second side equipment, operation 504 is executed.

At operation 503, it is determined, according to the link disconnection alarm information, that passive wavelength division equipment in the equipment group corresponding to the second side equipment fails.

At operation 504, it is determined whether all optical ports of the first side equipment and/or the second side equipment in the equipment group, corresponding to the first side equipment and/or the second side equipment which send the alarm, send the optical port alarm.

In a case where all the optical ports of the first side equipment and/or the second side equipment in the equipment group, corresponding to the first side equipment and/or the second side equipment which send the alarm, send the optical port alarm, it is determined that the passive wavelength division equipment in the equipment group fails.

Otherwise, it is determined that the passive wave division equipment in the equipment group is normal.

Compared with the related art, in this embodiment, multiple pieces of base station equipment are divided into groups according to a connection relationship, so that the passive wavelength division equipment connected to the first side equipment and the second side equipment may be determined according to the equipment group, and further the failed passive wavelength division equipment may be determined based on the alarm information of the first side equipment and/or the second side equipment. By dividing the base station equipment into groups, operation and maintenance personnel can clearly identify failed passive wavelength division equipment, and then quickly determine the location of the failed passive wavelength division equipment, thereby solving the problem in the related art that failure of passive wavelength division equipment cannot be accurately identified, and reducing the time spent by the operation and maintenance personnel on failure detection.

The division of the operations of the respective methods is only for the purpose of clear description. During implementation, some operations may be combined into one operation or certain operation may be divided into a plurality of operations, and all these changes fall within the scope of protection of the present disclosure as long as they include the same logic relationship. It is also within the scope of protection of the present disclosure to add insignificant modifications or introduce insignificant designs into the algorithms or flows without changing the core design of the algorithms and flows.

The embodiments of the present disclosure also relate to a method for detecting failure of passive wavelength division equipment. In practical networking of 5G devices, there are a variety of connection schemes. In the connection scheme shown in FIG. 4, one piece of baseband board equipment is only connected to one set of passive wavelength division equipment. In the connection scheme shown in FIG. 6, one piece of baseband board equipment is connected to two sets of passive wavelength division equipment, that is, two equipment groups relate to the connection to the same first side equipment and the same second side equipment.

In this embodiment, a scenario that one baseband board is connected to multiple sets of passive wavelength division equipment is involved.

After screening, from the plurality of obtained equipment groups, an equipment group of which the number of pieces of second side equipment is a preset number, and determining the screened equipment group as a final grouping result, the method further includes the following operations S1 to S3.

At operation S1, the number of pieces of passive wavelength division equipment connected to one piece of first side equipment is determined.

The method for determining the number of pieces of passive wavelength division equipment connected to one piece of first side equipment includes the following operations.

A connection relationship between optical ports of the first side equipment and optical ports of the second side equipment is obtained.

In a case where only one optical port of each piece of second side equipment in the same equipment group is connected to the first side equipment, it is determined that the number of pieces of passive wavelength division equipment connected to the first side equipment in the same equipment group is 1. In the connection scheme shown in FIG. 4, one optical port of each piece of AAU equipment is connected to the baseband board equipment, then the equipment group only includes one set of passive wavelength division equipment.

In a case where all optical ports of each piece of second side equipment in the same equipment group are connected to the first side equipment, it is determined that the number of pieces of passive wavelength division equipment connected to the first side equipment in the same equipment group is greater than 1. As shown in FIG. 6, two optical ports of each piece of AAU equipment are connected to the baseband board equipment, then the equipment group includes a plurality of pieces of passive wavelength division equipment.

At operation S2, in a case where the number of pieces of passive wavelength division equipment connected to one piece of first side equipment is 1, the grouping ends.

At operation S3, in a case where the number of pieces of passive wavelength division equipment connected to one piece of first side equipment is greater than 1, it is determined that optical ports of the second side equipment satisfying a second preset condition in the equipment group are connected to one set of passive wavelength division equipment, and optical ports of the first side equipment and the optical ports of the second side equipment connected to the set of passive wavelength division equipment are determined as one equipment group. The second preset condition includes that: a first optical port of each piece of second side equipment in the equipment group is connected to the same set of passive wavelength division equipment, or a second optical port of each piece of second side equipment in the equipment group is connected to the same set of passive wavelength division equipment.

Grouping of the base station equipment is performed based on the baseband board equipment, that is, it is ensured that each equipment group includes one piece of baseband board equipment. However, in the connection scheme in FIG. 6, because each optical port of the AAU equipment is connected to the baseband board equipment, and one piece of baseband board equipment in one equipment group is connected to multiple sets of passive wavelength division equipment, the equipment group including multiple sets of passive wavelength division equipment needs to be further split, so that the final equipment group only includes one set of passive wavelength division equipment.

That is to say, the final grouping result is that each equipment group only includes one set of passive wavelength division equipment.

It should be noted that each set of passive wavelength division equipment includes passive wavelength division equipment close to the first side equipment and passive wavelength division equipment close to the second side equipment.

After the pieces of equipment are divided into equipment groups, the method for detecting failure is as described in operation 202 and operation 203, and is not repeated herein.

Compared with the related art, in this embodiment, the multiple pieces of base station equipment are divided into groups according to a connection relationship, so that the passive wavelength division equipment connected to the first side equipment and the second side equipment may be determined according to the equipment group, and further the failed passive wavelength division equipment may be determined based on the alarm information of the first side equipment and/or the second side equipment. By dividing the base station equipment into groups, operation and maintenance personnel can clearly identify failed passive wavelength division equipment, and then quickly determine the location of the failed passive wavelength division equipment, thereby solving the problem in the related art that failure of passive wavelength division equipment cannot be accurately identified, and reducing the time spent by the operation and maintenance personnel on failure detection.

Figure 7:
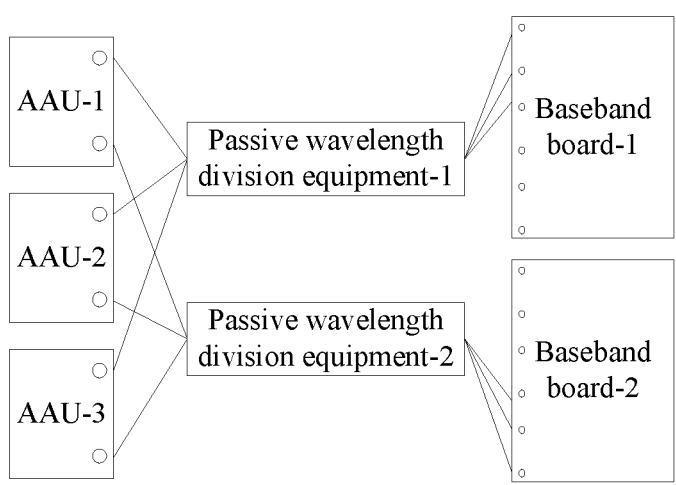
FIG. 7 is a connection scheme 3 of the method for detecting failure of passive wavelength division equipment according to the embodiments of the present disclosure.

The embodiments of the present disclosure also relate to another method for detecting failure of passive wavelength division equipment. In this embodiment, the connection scheme as shown in FIG. 7 is involved. That is, a preset number of pieces of AAU equipment are connected to a plurality of pieces of baseband board equipment, that is, as shown in FIG. 7, three pieces of AAU equipment are connected to two pieces of baseband board equipment.

The first side equipment satisfying a wavelength requirement of the passive wavelength division equipment is screened according to an optical port wavelength of the baseband board equipment.

The second side equipment connected to the screened first side equipment is determined according to the connection relationship between the first side equipment and the second side equipment, so as to obtain the plurality of equipment groups.

In the connection scheme as shown in FIG. 7, two equipment groups corresponding to the two pieces of baseband board equipment are connected to the same AAU equipment, and therefore, a connection relationship of the optical ports needs to be determined, that is, a connection relationship between the optical ports of the first side equipment and the optical ports of the second side equipment needs to be specified in each equipment group.

The connection scheme shown in FIG. 7 is determined in the following manner.

When one optical port of each of a preset number of pieces of second side equipment is connected to the first baseband board, and other optical ports of the preset number of pieces of second side equipment are connected to the second baseband board, it may be determined that the current connection scheme is the connection scheme shown in FIG. 7.

It should be noted that, in a base station, the connection scheme of the base station equipment may include any one, any two or all of the connection schemes in FIG. 4, FIG. 5 and FIG. 6.

After the pieces of equipment are divided into equipment groups, the method for detecting failure is as described in operation 202 and operation 203, and is not repeated herein.

Compared with the related art, in this embodiment, the multiple pieces of base station equipment are divided into groups according to a connection relationship, so that the passive wavelength division equipment connected to the first side equipment and the second side equipment may be determined according to the equipment group, and further the failed passive wavelength division equipment may be determined based on the alarm information of the first side equipment and/or the second side equipment. By dividing the base station equipment into groups, operation and maintenance personnel can clearly identify failed passive wavelength division equipment, and then quickly determine the location of the failed passive wavelength division equipment, thereby solving the problem in the related art that failure of passive wavelength division equipment cannot be accurately identified, and reducing the time spent by the operation and maintenance personnel on failure detection.

The embodiments of the present disclosure also relate to another method for detecting failure of passive wavelength division equipment. In this embodiment, the base station equipment has been pre-modeled. In addition to modeling the first side equipment, the second side equipment, and the uplink/downlink relationship between the first side equipment and the second side equipment, the wavelength division equipment in the base station equipment may also be modeled, including a category of the wavelength division equipment, a subnet ID and a network element ID where the wavelength division equipment is located, an equipment position, and a connection relationship between the wavelength division equipment, and the first side equipment and the second side equipment. The wavelength division equipment includes active wavelength division equipment and passive wavelength division equipment. As an exemplary implementation, before operation 201, the method further includes the following operations.

Whether the base station equipment is modeled is determined.

In a case where the base station equipment is modeled, modeling information of the base station equipment is obtained. The modeling information includes a connection relationship among the passive wavelength division equipment, the first side equipment and the second side equipment.

A plurality of equipment groups is obtained according to the modeling information, wherein the first side equipment and the second side equipment which are connected to the same passive wavelength division equipment belong to the same equipment group.

The modeling information includes wavelength division equipment information and wavelength division equipment link information, as shown in Table 1 and Table 2.

In Table 1, the type of the wavelength division equipment is an OMD, which means that the wavelength division equipment is passive wavelength division equipment. Based on Table 1, the subnet ID and the network element ID corresponding to the passive wavelength division equipment can be learned, and the passive wavelength division equipment can be identified.

After the passive wavelength division equipment is determined from Table 1, the equipment connected to the passive wavelength division equipment may be queried from Table 2.

As can be seen from the three records in Table 2, "Link 1: source address VBP_1_7, destination address OMD_1" indicates the link connecting the baseband board equipment and the passive wavelength division equipment; "Link 2: source address OMD_2, destination address 51" indicates the link connecting the passive wavelength division equipment and the AAU equipment; "Link 3: source address OMD_1, destination address OMD_2" indicates the link connecting the two pieces of passive wavelength division equipment, that is, the OMD_1 and the OMD_2 belong to the same set of passive wavelength division equipment, and the baseband board equipment and the AAU equipment connected to the OMD_1 and the OMD_2 belong to the same equipment group.

It should be noted that, because the base station equipment has been modeled, in a specific practical application, there is no need to perform grouping processing based on the modeling, and passive wavelength division equipment corresponding to the equipment sending the alarm information can be learned by querying the equipment sending the alarm information in the modeling information, and then whether the passive wavelength division equipment fails may be determined according to operations 202 and 203.

The difference between the solutions when the base station equipment is modeled and when the base station equipment is not modeled lies in whether to perform grouping processing. The base station equipment that has been modeled does not need the grouping processing, that is, operation 201 does not need to be performed. In the solutions when the base station equipment is modeled and when the base station equipment is not modeled, the method for detecting failure is basically the same, that is, operation 202 and operation 203 are performed. Because the method for detecting failure has been described in detail in other embodiments, details of the method for detecting failure are not repeated in this embodiment.

Compared with the related art, in this embodiment, for the base station equipment that has been modeled, the connection relationship between the first side equipment and the second side equipment and the passive wavelength division equipment may be determined directly according to the modeling information without the need of executing the grouping processing, thereby reducing the flow of the grouping process. In addition, the modeling information obtained through pre-modeling for the base station equipment is established according to the connection relationship during actual networking, and therefore, the accuracy of determining the connection relationship will be improved to some extent. Moreover, the modeling may be applicable to any networking connection scheme, so that the method for detecting failure of passive wavelength division equipment provided in the embodiments of the present disclosure is applicable to more application scenarios.

Figure 8:
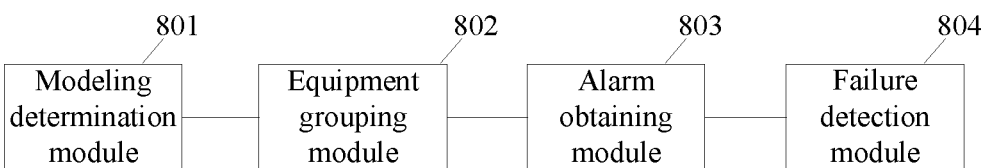
FIG. 8 is a schematic structural diagram of an apparatus for detecting failure of passive wavelength division equipment according to the embodiments of the present disclosure.

The embodiments of the present disclosure also relate to an apparatus for detecting failure of passive wavelength division equipment. As shown in FIG. 8, the apparatus includes:

a modeling determination module 801, configured to determine whether base station equipment is pre-modeled, wherein the base station equipment at least includes first side equipment, second side equipment, and passive wavelength division equipment;

an equipment grouping module 802, configured to divide, in a case where the base station equipment is not pre-modeled, the first side equipment and the second side equipment in the base station equipment into a plurality of equipment groups, wherein the first side equipment and the second side equipment having a connection relationship belong to the same equipment group, and each equipment group has one set of correspondingly connected passive wavelength division equipment;

an alarm obtaining module 803, configured to obtain optical port alarm information of the first side equipment in the base station equipment and/or optical port alarm information of the second side equipment in the base station equipment, or obtain link disconnection alarm information of the second side equipment in the base station equipment; and a failure detection module 804, configured to: in a case where no link disconnection alarm information of the second side equipment is obtained, and it is determined, according to the optical port alarm information, that there is an equipment group satisfying a first preset condition, determine that the passive wavelength division equipment corresponding to the equipment group satisfying the first preset condition fails, wherein the first preset condition includes: in the same equipment group, optical ports, for connecting to the passive optical division equipment, of respective first side equipment all send an alarm, and/or optical ports, for connecting to the passive optical division equipment, of respective second side equipment all send an alarm.

It is easily found that this embodiment is an apparatus embodiment corresponding to other embodiments, and this embodiment can be implemented in cooperation with other embodiments. Related technical details mentioned in other embodiments are still valid in this embodiment, and are not repeated herein to reduce repetition. Accordingly, the related technical details mentioned in this embodiment may also be applied in other embodiments.

It should be noted that all modules involved in this embodiment are logic modules. In a practical application, one logic unit may be one physical unit or a part of one physical unit, and may also be implemented by using a combination of a plurality of physical units. In addition, in order to highlight the innovation part of the present disclosure, the present embodiment does not introduce units less closely related to solving the technical problem proposed in the present embodiment, but this does not mean that other units do not exist in the present embodiment.

Figure 9:
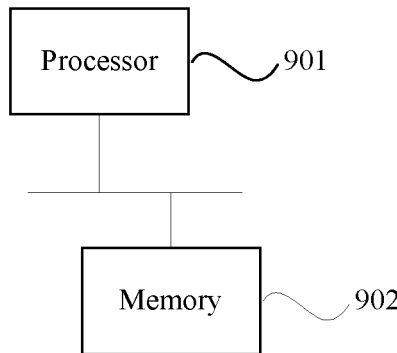
FIG. 9 is a schematic structural diagram of a server according to the embodiments of the present disclosure.

The embodiments of the present disclosure also relate to a server. As shown in FIG. 9, the server includes:

at least one processor 901, and a memory 902 in communication connection with the at least one processor 901. The memory stores an instruction that is able to be executed by the at least one processor 901, wherein the instruction, when being executed by the at least one processor 901, causes the at least one processor 901 to execute any embodiment for the method for detecting failure of passive wavelength division equipment.

The memory and the processor are connected via a bus. The bus may include any number of interconnected buses and bridges. The bus links various circuits of the one or more processors and the memory together. The bus may also link various other circuits together, such as peripheral devices, regulators, and power management circuitry, which are well known in the art and therefore are not described further herein. The bus interface provides an interface between the bus and a transceiver. The transceiver may be one element or multiple elements, such as multiple receivers and transmitters, which provide a means for communicating with various other devices over a transmission medium. Data processed by a processor is transmitted on a wireless medium through an antenna, and further, the antenna receives the data and transmits the data to the processor.

The processor is responsible for bus managing and general processing, and may further provide various functions, including timing, peripheral interfaces, voltage regulation, power management, and other control functions. The memory may be used to store data used by the processor in performing operations.

A persons having ordinary skill in the art may understand that all or a part of the operations of the method according to the embodiments of the present disclosure may be implemented by a program instructing relevant hardware. The program is stored in a storage medium, and includes several instructions for instructing a device (which may be a single chip, a chip, or the like) or a processor to execute all or a part of the operations of the method according to the embodiments of the present disclosure. The foregoing storage medium includes: any medium that can store program codes, such as a USB flash disk, a removable hard disk, a Read-Only Memory (ROM), a Random Access Memory (RAM), a magnetic disk, or an optical disk.

A person having ordinary skill in the art may understand that the foregoing embodiments are exemplary embodiments for implementing the present disclosure, and in practical applications, various changes may be made in form and details without departing from the principle and scope of the present disclosure.

What is claimed is:

1. A method for detecting failure of passive wavelength division equipment, comprising:
   determining whether base station equipment is pre-modeled, wherein the base station equipment at least comprises first side equipment, second side equipment, and passive wavelength division equipment;
   in a case where the base station equipment is not pre-modeled, dividing the first side equipment and the second side equipment in the base station equipment into a plurality of equipment groups, wherein the first side equipment and the second side equipment having a connection relationship belong to the same equipment group, and each equipment group has one set of correspondingly connected passive wavelength division equipment;
   obtaining optical port alarm information of the first side equipment in the base station equipment and/or optical port alarm information of the second side equipment in the base station equipment, or obtaining link disconnection alarm information of the second side equipment in the base station equipment; and
   in a case where no link disconnection alarm information of the second side equipment is obtained, and it is determined, according to the optical port alarm information, that there is an equipment group satisfying a first preset condition, determining that the passive wavelength division equipment corresponding to the equipment group satisfying the first preset condition fails, wherein the first preset condition comprises: in the same equipment group, optical ports, for connecting to the passive optical division equipment, of respective first side equipment all send an alarm, and/or optical ports, for connecting to the passive optical division equipment, of respective second side equipment all send an alarm.

2. The method for detecting failure of passive wavelength division equipment according to claim 1, wherein after determining whether the base station equipment is pre-modeled, and before obtaining the optical port alarm information of the first side equipment in the base station equipment and/or the optical port alarm information of the second side equipment in the base station equipment, or obtaining the link disconnection alarm information of the second side equipment in the base station equipment, the method further comprises:
   in a case where the base station equipment is pre-modeled, obtaining modeling information of the base station equipment, wherein the modeling information comprises a connection relationship among the passive wavelength division equipment, the first side equipment and the second side equipment; and
   obtaining a plurality of equipment groups according to the modeling information, wherein the first side equipment and the second side equipment which are connected to the same passive wavelength division equipment belong to the same equipment group.

3. The method for detecting failure of passive wavelength division equipment according to claim 1, wherein the first side equipment is baseband board equipment; and dividing the first side equipment and the second side equipment in the base station equipment into the plurality of equipment groups comprises:

screening, according to an optical port wavelength of the baseband board equipment, the first side equipment satisfying a wavelength requirement of the passive wavelength division equipment; and determining, according to the connection relationship between the first side equipment and the second side equipment, the second side equipment connected to the screened first side equipment, so as to obtain the plurality of equipment groups.

4. The method for detecting failure of passive wavelength division equipment according to claim 3, wherein after determining, according to the connection relationship between the first side equipment and the second side equipment, the second side equipment connected to the screened first side equipment, so as to obtain the plurality of equipment groups, the method comprises:

screening, from the plurality of obtained equipment groups, an equipment group of which the number of pieces of second side equipment is a preset number, and determining the screened equipment group as a grouping result, wherein the preset number is determined according to a connection situation of the base station equipment.

5. The method for detecting failure of passive wavelength division equipment according to claim 4, wherein after screening, from the plurality of obtained equipment groups, the equipment group of which the number of pieces of second side equipment is the preset number, and determining the screened equipment group as the grouping result, the method further comprises:

determining the number of pieces of passive wavelength division equipment connected to the first side equipment in the same equipment group;

in a case where the number of pieces of passive wavelength division equipment connected to the first side equipment in the same equipment group is greater than 1, determining that optical ports of the second side equipment satisfying a second preset condition in the equipment group are connected to one set of passive wavelength division equipment, and determining optical ports of the first side equipment and the optical ports of the second side equipment connected to the set of passive wavelength division equipment as one equipment group, wherein the second preset condition comprises that: a first optical port of each piece of second side equipment in the equipment group is connected to the same set of passive wavelength division equipment, or a second optical port of each piece of second side equipment in the equipment group is connected to the same set of passive wavelength division equipment.

6. The method for detecting failure of passive wavelength division equipment according to claim 5, wherein determining the number of pieces of passive wavelength division equipment connected to the first side equipment in the same equipment group comprises:

obtaining a connection relationship between optical ports of the first side equipment and optical ports of the second side equipment;

in a case where only one optical port of each piece of second side equipment in the same equipment group is connected to the first side equipment, determining that the number of pieces of passive wavelength division equipment connected to the first side equipment in the same equipment group is 1;

in a case where all optical ports of each piece of second side equipment in the same equipment group are connected to the first side equipment, determining that the number of pieces of passive wavelength division equipment connected to the first side equipment in the same equipment group is greater than 1.

7. The method for detecting failure of passive wavelength division equipment according to claim 1, wherein after dividing the first side equipment and the second side equipment in the base station equipment into the plurality of equipment groups, the method comprises:

generating a topological graph of each obtained equipment group according to the plurality of obtained equipment groups; and when the first side equipment and/or the second side equipment in the equipment group send an alarm, automatically identifying the first side equipment and/or the second side equipment that send the alarm in the topological graph.

8. The method for detecting failure of passive wavelength division equipment according to claim 1, wherein after obtaining the optical port alarm information of the first side equipment in the base station equipment and/or the optical port alarm information of the second side equipment in the base station equipment, or obtaining the link disconnection alarm information of the second side equipment in the base station equipment, the method further comprises:

when obtaining the link disconnection alarm information of the second side equipment, determining that the passive wavelength division equipment corresponding to the equipment group, to which the second side equipment that sends the link disconnection alarm information belongs, fails.

9. A server, comprising:

at least one processor; and a memory in communication connection with the at least one processor, wherein the memory stores an instruction that is able to be executed by the at least one processor, wherein the instruction, when being executed by the at least one processor, causes the at least one processor to execute following operations:

determining whether base station equipment is pre-modeled, wherein the base station equipment at least comprises first side equipment, second side equipment, and passive wavelength division equipment;

in a case where the base station equipment is not pre-modeled, dividing the first side equipment and the second side equipment in the base station equipment into a plurality of equipment groups, wherein the first side equipment and the second side equipment having a connection relationship belong to the same equipment group, and each equipment group has one set of correspondingly connected passive wavelength division equipment;

obtaining optical port alarm information of the first side equipment in the base station equipment and/or optical port alarm information of the second side equipment in the base station equipment, or obtaining link disconnection alarm information of the second side equipment in the base station equipment; and in a case where no link disconnection alarm information of the second side equipment is obtained, and it is determined, according to the optical port alarm information, that there is an equipment group satisfying a first preset condition, determining that the passive wavelength division equipment corresponding to the equipment group satisfying the first preset condition fails, wherein the first preset condition comprises: in the same equipment group, optical ports, for connecting to the passive optical division equipment, of respective first side equipment all send an alarm, and/or optical ports, for connecting to the passive optical division equipment, of respective second side equipment all send an alarm.

10. A non-transitory computer-readable storage medium, storing a computer program, wherein the computer program, when being executed by a processor, causes the processor to execute the following operations:

determining whether base station equipment is pre-modeled, wherein the base station equipment at least comprises first side equipment, second side equipment, and passive wavelength division equipment;

in a case where the base station equipment is not pre-modeled, dividing the first side equipment and the second side equipment in the base station equipment into a plurality of equipment groups, wherein the first side equipment and the second side equipment having a connection relationship belong to the same equipment group, and each equipment group has one set of correspondingly connected passive wavelength division equipment;

obtaining optical port alarm information of the first side equipment in the base station equipment and/or optical port alarm information of the second side equipment in the base station equipment, or obtaining link disconnection alarm information of the second side equipment in the base station equipment; and in a case where no link disconnection alarm information of the second side equipment is obtained, and it is determined, according to the optical port alarm information, that there is an equipment group satisfying a first preset condition, determining that the passive wavelength division equipment corresponding to the equipment group satisfying the first preset condition fails, wherein the first preset condition comprises: in the same equipment group, optical ports, for connecting to the passive optical division equipment, of respective first side equipment all send an alarm, and/or optical ports, for connecting to the passive optical division equipment, of respective second side equipment all send an alarm.

11. The method for detecting failure of passive wavelength division equipment according to claim 2, wherein in a modeling process, the method further comprises:

modeling the connection relationship between the first side equipment and the second side equipment, and determining the passive wavelength division equipment among the base station equipment, wherein a dedicated equipment table comprising a subnet ID, a network element ID, a device location, and a type of the wavelength division equipment is established for the passive wavelength division equipment, and a link table for the wavelength division equipment comprising a link number, a subnet ID, a network element ID, a source address of a link, and a destination address of the link is established for the wavelength division equipment.

12. The method for detecting failure of passive wavelength division equipment according to claim 3, further comprising:

obtaining configuration information of respective base station equipment in a base station, wherein the configuration information comprises the connection relationship between the first side equipment and the second side equipment, and the optical port wavelength of the baseband board equipment in the first side equipment.

13. The method for detecting failure of passive wavelength division equipment according to claim 1, wherein the second side equipment at least comprises Active Antenna Unit (AAU) equipment; or the second side equipment at least comprises AAU equipment and Remote Radio Unit (RRU) equipment.

14. The method for detecting failure of passive wavelength division equipment according to claim 1, wherein after determining whether the base station equipment is pre-modeled, and before obtaining the optical port alarm information of the first side equipment in the base station equipment and/or the optical port alarm information of the second side equipment in the base station equipment, or obtaining the link disconnection alarm information of the second side equipment in the base station equipment, the method further comprises:

in a case where the base station equipment is pre-modeled, obtaining modeling information of the base station equipment, wherein the modeling information comprises a connection relationship among the passive wavelength division equipment, the first side equipment and the second side equipment; and determining, by querying the first side equipment and/or the second side equipment sending the alarm information in the modeling information, the passive wavelength division equipment corresponding to the first side equipment and/or the second side equipment sending the alarm information.

15. The server according to claim 9, wherein the instruction, when being executed by the at least one processor, causes the at least one processor to further execute following operations after determining whether the base station equipment is pre-modeled, and before obtaining the optical port alarm information of the first side equipment in the base station equipment and/or the optical port alarm information of the second side equipment in the base station equipment, or obtaining the link disconnection alarm information of the second side equipment in the base station equipment:

in a case where the base station equipment is pre-modeled, obtaining modeling information of the base station equipment, wherein the modeling information comprises a connection relationship among the passive wavelength division equipment, the first side equipment and the second side equipment; and obtaining a plurality of equipment groups according to the modeling information, wherein the first side equipment and the second side equipment which are connected to the same passive wavelength division equipment belong to the same equipment group.

16. The server according to claim 9, wherein the first side equipment is baseband board equipment; and dividing the first side equipment and the second side equipment in the base station equipment into the plurality of equipment groups comprises:

screening, according to an optical port wavelength of the baseband board equipment, the first side equipment satisfying a wavelength requirement of the passive wavelength division equipment; and determining, according to the connection relationship between the first side equipment and the second side equipment, the second side equipment connected to the screened first side equipment, so as to obtain the plurality of equipment groups.

17. The server according to claim 16, wherein the instruction, when being executed by the at least one processor, causes the at least one processor to further execute following operations after determining, according to the connection relationship between the first side equipment and the second side equipment, the second side equipment connected to the screened first side equipment, so as to obtain the plurality of equipment groups:

screening, from the plurality of obtained equipment groups, an equipment group of which the number of pieces of second side equipment is a preset number, and determining the screened equipment group as a grouping result, wherein the preset number is determined according to a connection situation of the base station equipment.

18. The server according to claim 17, wherein the instruction, when being executed by the at least one processor, causes the at least one processor to further execute following operations after screening, from the plurality of obtained equipment groups, the equipment group of which the number of pieces of second side equipment is the preset number, and determining the screened equipment group as the grouping result:

determining the number of pieces of passive wavelength division equipment connected to the first side equipment in the same equipment group;

in a case where the number of pieces of passive wavelength division equipment connected to the first side equipment in the same equipment group is greater than 1, determining that optical ports of the second side equipment satisfying a second preset condition in the equipment group are connected to one set of passive wavelength division equipment, and determining optical ports of the first side equipment and the optical ports of the second side equipment connected to the set of passive wavelength division equipment as one equipment group, wherein the second preset condition comprises that: a first optical port of each piece of second side equipment in the equipment group is connected to the same set of passive wavelength division equipment, or a second optical port of each piece of second side equipment in the equipment group is connected to the same set of passive wavelength division equipment.

19. The server according to claim 17, wherein determining the number of pieces of passive wavelength division equipment connected to the first side equipment in the same equipment group comprises:

obtaining a connection relationship between optical ports of the first side equipment and optical ports of the second side equipment;

in a case where only one optical port of each piece of second side equipment in the same equipment group is connected to the first side equipment, determining that the number of pieces of passive wavelength division equipment connected to the first side equipment in the same equipment group is 1;

in a case where all optical ports of each piece of second side equipment in the same equipment group are connected to the first side equipment, determining that the number of pieces of passive wavelength division equipment connected to the first side equipment in the same equipment group is greater than 1.

20. The server according to claim 9, wherein the instruction, when being executed by the at least one processor, causes the at least one processor to further execute following operations after dividing the first side equipment and the second side equipment in the base station equipment into the plurality of equipment groups:

generating a topological graph of each obtained equipment group according to the plurality of obtained equipment groups; and when the first side equipment and/or the second side equipment in the equipment group send an alarm, automatically identifying the first side equipment and/or the second side equipment that send the alarm in the topological graph.

* * * * *